ically changed over so as to reopen the window thereby
United States Patent
Ito et al.

[15] 3,651,389
[45] Mar. 21, 1972

[54] SAFETY DEVICE FOR USE WITH AUTOMATIC AUTOMOBILE WINDOW REGULATOR

[72] Inventors: Shigehiko Ito, Kariya-shi; Hiroshi Arai, Toyota-shi, both of Japan

[73] Assignee: Nippon Denso Kabushiki Kaisha, Showa-cho, Kariya-shi, Aichi-ken, Japan

[22] Filed: Nov. 3, 1969

[21] Appl. No.: 873,320

[30] Foreign Application Priority Data

Nov. 9, 1968   Japan..................................43/97823

[52] U.S. Cl..............................318/266, 318/286, 318/466
[51] Int. Cl. .........................................................H02p 1/22
[58] Field of Search ........................318/266, 286, 466, 478; 317/123 P; 340/258; 200/DIG. 1

[56] References Cited

UNITED STATES PATENTS

| 3,409,842 | 11/1968 | Emblins et al. | 331/65 |
| 3,513,374 | 5/1970 | Koment | 318/266 |
| 3,525,028 | 8/1970 | Ruoss et al. | 318/478 |
| 3,200,304 | 8/1965 | Atkins et al. | 200/DIG. 1 |

*Primary Examiner*—Gene Z. Rubinson
*Assistant Examiner*—W. E. Duncanson, Jr.
*Attorney*—Cushman, Darby & Cushman

[57] ABSTRACT

A safe automatic window regulator so designed that if the human body and the like touches the upper end of the window glass, it is sensed so that even if the switch has been closed in the direction to close the window, the electric circuit is automatically changed over so as to reopen the window thereby preventing harm to the human body and the like due to any inadvertency.

5 Claims, 1 Drawing Figure

3,651,389
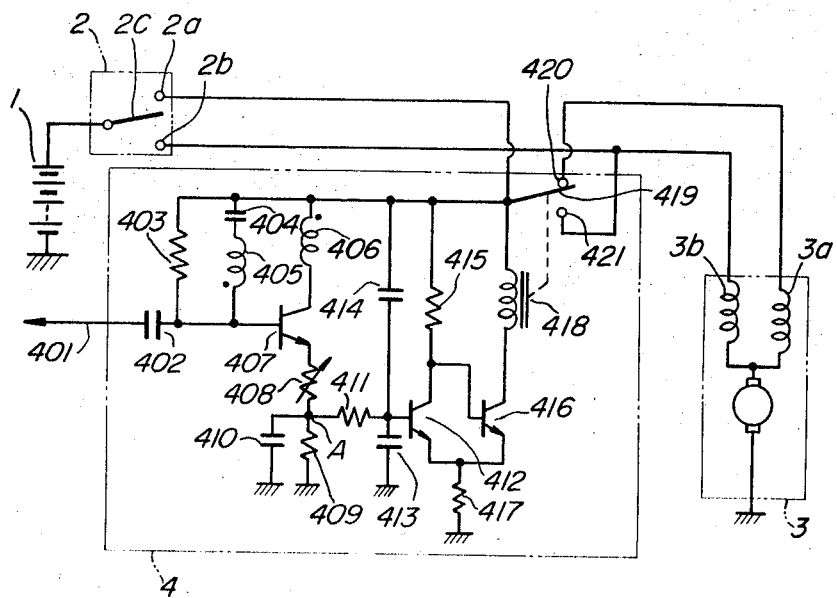
Inventors
Shigehiko Ito
Hiroshi Arai
By Cushman, Darby & Cushman
Attorneys.

SAFETY DEVICE FOR USE WITH AUTOMATIC AUTOMOBILE WINDOW REGULATOR

BACKGROUND OF THE INVENTION

1. FIELD OF THE INVENTION

The present invention relates to a safety device for use with automatic automobile window regulators which automatically stops the rising movement of the window glass to prevent any harm to the human body, should a hand or the like be caught between the window glass and the window frame.

2. DESCRIPTION OF THE PRIOR ART

Conventionally, the vertical movement of an automobile window glass was effected by manually turning the handle to raise or lower the window glass. However, with the manufacture of more and more elaborate automobiles, the recent trend is towards manufacturing an increasing number of windows in which the window glass is automatically powered by an electric motor. However, such powered windows are very dangerous in a sense, because, if its switch is operated by mistake by a child and the like and a hand or the like is caught between the window glass and the window frame, the window glass will nevertheless continue its upward movement with the hand or the like being caught therebetween.

SUMMARY OF THE INVENTION

The general object of the present invention is to provide a highly safe automatic window regulator wherein, if a part of the human body and the like touches the upper end of the window glass, it is sensed so that, even if the switch has been closed in the direction to close the window, the electric circuit is automatically changed over so as to reopen the window to thereby prevent hurt to the human body and the like due to an inadvertency.

More specifically, the object of the present invention is to provide what is stated in the claim.

According to the present invention, a relay circuit for detecting a hand or the like which is caught by the window glass includes an oscillation circuit wherein the base circuit of its oscillating transistor is connected to an electrode mounted on the upper end of the window glass, and a high-frequency oscillation circuit is employed as the said oscillation circuit whose oscillation frequency is determined by the inductance and stray capacitance of the oscillating coil and by the stray inductance and stray capacitance of the base circuit of the oscillating transistor, whereby the oscillating condition of the oscillation circuit in the device of the present invention is made very critical so that a very slight electrical change in the base circuit of the oscillating transistor caused by a hand or the like touching the electrode may readily cause the oscillation circuit to start or stop its oscillation, hence not only the detection sensitivity is excellent but also the external appearance of the window is not spoiled since the sensing means comprises merely an electrode of a very simple construction such as a conductor foil. These are the remarkable effects attributable to the present invention.

Moreover, because the oscillating transistor is provided with an emitter bias resistor and a portion of this bias resistor is composed of a variable resistor to accomplish a negative feedback from this variable resistor to the oscillating transistor, there is a further advantage that the magnitude of the negative feedback to the oscillating transistor is changed according to the resistance value of the variable resistor to adjust the stability of the oscillation circuit thereby achieving the adjustment of the sensitivity of the oscillation circuit very easily. Furthermore, there is another advantage that there is no need to especially provide a transformer and the like in the output circuit of the oscillation circuit, since the oscillation output is taken out from the said emitter bias resistor.

BRIEF DESCRIPTION OF THE DRAWING

The accompanying drawing is an electrical wiring diagram showing an embodiment of the present invention.

DESCRIPTION OF THE PREFERRED EMBODIMENT

The present invention will be explained hereinafter in conjunction with the illustrated embodiment. In the accompanying drawing, numeral 1 designates a power source such as a storage battery, and 2 a switch in which a movable contact 2c is manually operated to contact with either one of fixed contacts 2a and 2b. Numeral 3 designates an electric motor for operating the window regulator which is so constructed that it makes a forward rotation when the motor is energized through a field coil 3a, and that the direction of rotation of the motor is reversed when it is energized through the other field coil 3b. Numeral 4 designates a relay circuit according to the present invention, and 401 an antenna connected to an electrode such as a conductor foil mounted on the upper end of the window glass. Numeral 402 designates a capacitor to block the relay circuit 4 from the antenna 401 with respect to the DC component. Numeral 403 designates a resistor, and 404 a capacitor to block the DC component. Numeral 405 designates an oscillating coil, and 406 also designates an oscillating coil, both coils being wound so that they have their polarities set as shown by the mark "." in the drawing. Numeral 407 designates an oscillating transistor, and the oscillation circuit composed of the transistor 407 and the coils 405 and 406 forms a high-frequency oscillation circuit whose oscillation frequency is of the order of several MHz. Here, the oscillation frequency of the oscillation circuit is determined by the inductance and stray capacitance of the oscillating coil 405 on the side of the base of the oscillating transistor 407 and by the stray inductance and stray capacitance of the base circuit of the oscillating transistor 407. Numeral 408 designates a variable resistor constituting a portion of the emitter bias resistor for the oscillating transistor 407, and 409 a resistor constituting also a portion of the emitter bias resistor for the transistor 407, a bypass capacitor 410 being connected in parallel with the resistor 409. Numeral 411 designates a bias resistor for a transistor 412; 413 and 414 capacitors to ensure the conduction of the transistor 412 upon applying the source voltage to the circuit so that a relay coil 418 will not be operated by mistake due to the conduction of a transistor 416. Numeral 415 designates a load resistor of the transistor 412. The transistor 416 forms a Schmitt circuit with the transistor 412. Numeral 417 designates a common emitter resistor of both transistors 412 and 416, which provides a hysteresis effect for the on-off operations. Numeral 419 designates a movable contact actuated by the relay coil 418 and 420 and 421 a normally closed fixed contact and a normally open fixed contact associated with the movable contact, respectively.

With the construction described above, the operation of the device according to the present invention will be explained hereinafter. Now, assuming that the movable contact 2c of the switch 2 is caused to contact with the fixed contact 2a to close the window, current is supplied to the electric motor 3 through the field coil 3a, and the motor 3 makes a forward running, whereupon the window glass is moved upward. At this instance, the relay circuit 4 is supplied with the source voltage through the contacts 2c and 2a, so that the oscillation operation of the oscillating transistor 407 is caused by the feedback action between the oscillating coils 405 and 406, and the oscillation output voltage of the transistor appears across the resistors 408 and 409. This causes the potential raise at the junction point A of the resistors 408 and 409, and the transistor 412 in the succeeding stage conducts, so that the transistor 416 is brought into a nonconducting state, and the relay coil 418 remains deenergized, thereby leaving the movable contact 419 to be in contact with the normally closed fixed contact 420. On the other hand, since the antenna 401 of the relay circuit 4 is connected with the electrode mounted on the upper end of the window glass or in the vicinity thereof, if a portion of the human body such as a hand and the like touches the said electrode, it is equivalent to that the base of the oscillating transistor 407 is grounded by means of a certain capacitance of the human body, and the oscillating condition of the oscillation circuit including the transistor 407 collapses thereby stopping the oscillation.

Here, as the oscillation circuit comprising the oscillating transistor 407 and the oscillating coils 405 and 406 are formed as a high-frequency oscillation circuit whose frequency of oscillation is determined by the inductance and stray capacitance of the oscillating coil 405 and by the stray inductance and stray capacitance of the base circuit of the oscillating transistor 407, the waveform of the generated output is very unstable and the condition for oscillation of this oscillation circuit is made extremely critical. It is thus possible to readily stop the oscillation of the transistor 407 by simply causing a small portion of the electric signal feedback to the oscillating transistor 407 to leak to the ground through the human body and the like. It is to be recalled here that the emitter bias resistors 408 and 409 is inserted into the emitter circuit of the oscillating transistor 407, and the variable resistor 408 is employed as a portion of this bias resistor to accomplish a negative feedback from the variable resistor 408 to the oscillating transistor 407, and the sensitivity of the oscillation circuit may be thereby readily adjusted, because any adjustment of the magnitude of the variable resistor 408 to change the amount of the negative feedback will change the oscillating condition of the oscillation circuit and subsequently the stability of the oscillation. Then, since the succeeding stage transistor 412 is driven into cut off and the transistor 416 conducts when the oscillating transistor 407 stops its oscillation as previously described, a current is supplied to the relay coil 418, and the movable contact 419 comes into contact with the normally open fixed contact 421. This causes a current to flow into the electric motor 3 through the reversing field coil 3b, hence the window glass in the upward movement is reversed. The instant an obstacle, such as the hand or the like, is removed, the oscillating transistor 407 starts its oscillation again, and the transistor 412 conducts thereby cutting off the transistor 416, whereby the movable contact 419 comes into contact with the normally closed fixed contact 420 thus causing the window glass to move upward again. In this case, a limit switch and the like may be employed to detect the position of the window glass when it has moved up to the position where the upper end of the window glass contacts with the window frame to thereby prevent the relay coil 418 from being actuated again. By this means, such an undesired operation may be avoided that, although no hand or the like is caught between the electrode and the window frame, the relay coil 418 should be energized by the capacitance between the electrode and the window frame, and that the direction of the rotation of the electric motor 3 should be thereby reversed to cause the window glass to go downwards even under such a normal operation condition. Instead of employing a limit switch, the window frame may be formed so that only the electrode section of the antenna 401 may be free from the contact with the window frame when the upper end of the window glass reaches the position where it contacts with the window frame. The present invention will not be limited to those in which the window regulation is effected by means of an electric motor, but is equally applicable to a pneumatic or a hydraulic window regulator if a relay is utilized to control the opening and closing of the pneumatic or the hydraulic circuit.

Now, referring to the experiments conducted with the following component parts: the oscillating coil 405—diameter of winding 15 $\phi$, number of turns 25; oscillating coil 406—diameter of winding 10 $\phi$, number of turns 15; the capacitor 402—0.001 to 0.01 $\mu f.$; the resistor 403—1M$\Omega$; the capacitor 402—500 pf. to 0.1 $\mu f.$; the electrode of the antenna 401—a conductor foil; and the oscillation frequency of the oscillation circuit — 4 to 5 MHz, the results obtained from the experiments have shown that the upward movement of the window glass was exactly prevented when the said electrode was touched with a hand.

We claim:

1. A safety device for use with automatic automobile window regulators wherein a reversible window regulating motor is provided for raising and lowering at least one window glass, said safety device comprising:

an oscillation circuit comprising an oscillating transistor, series connected emitter bias resistors connected to the emitter of said transistor, oscillation coil means connected between the collector and the base of said transistor, and an electrode for mounting on the upper end of said window glass and connected to the base of said transistor, said oscillation circuit being oscillatable with a high frequency which is determined by the inductance of said oscillation coils and by the stray capacitance and the stray inductance of said electrode, one of said emitter bias resistors being a variable resistor for adjusting the amount of negative feedback from the emitter to the base of said oscillating transistor by varying the resistance thereof, the other of said resistors being bypassed by a capacitor and oscillation output of said oscillation circuit being taken from the junction of said emitter bias resistors;

a relay and a relay control circuit, said relay control circuit being responsive to said oscillation output for controlling the energization of said relay; and means in said control circuit for automatically reversing said window regulating motor to lower said glass in response to operation of said relay.

2. A safety device as in claim 1, wherein said emitter bias resistors are connected between the emitter of said transistor and ground, said oscillation coil means comprising a first oscillation coil connected to the collector of said transistor and a second oscillation coil connected to the base of said transistor, and wherein a coupling capacitor is connected between said electrode and the base of said oscillating transistor.

3. A safety device as in claim 2, wherein said oscillation circuit further comprises a DC blocking capacitor connected in series with second oscillation coil, and a resistor connected between the base of said transistor and said power source.

4. A safety device for use with an automatic automobile window regulator having a power source, a window regulator motor, and a manual switch for changing the direction of said motor to open or close a window glass, comprising:

electrode detecting means adapted to be mounted on said window glass for signalling the presence of an adjacent human object by changing its stray impedance, a transistorized oscillator circuit electrically connected to said electrode and coil structured to change its normal operation into an abnormal operating condition when and only while the stray impedance of said electrode means changes as aforesaid, and means connected to said oscillator circuit and responsive only to said abnormal condition for automatically reversing said motor to cause said glass to move in an opening direction while said manual switch is in a position normally to cause closing of the glass so as to prevent said human object from being caught by closing glass, said reversing means being also responsive immediately upon cessation of said abnormal condition and return of said oscillator circuit to its said normal operation due to sufficient removal of said human object from said electrode detecting means to effect automatic re-reversing of said motor so that said window glass resumes its movement in the closing direction while the said manual switch remains in its said normal closing position.

5. A safety device as in claim 4 wherein said oscillator abnormal operating condition is a non-oscillating condition and said electrode detecting means is a conductor foil adapted to mount on the closing edge of said window glass.

* * * * *